United States Patent [19]
Matsumoto et al.

[11] Patent Number: 6,071,987
[45] Date of Patent: *Jun. 6, 2000

[54] SILICONE EMULSION COMPOSITION AND PROCESS FOR PRODUCING SILICONE POWDER THEREFROM

[75] Inventors: Makoto Matsumoto; Masanori Takanashi, both of Tokyo, Japan

[73] Assignee: Toshiba Silicone Co., Ltd., Tokyo, Japan

[ * ] Notice: This patent is subject to a terminal disclaimer.

[21] Appl. No.: 08/903,374

[22] Filed: Jul. 30, 1997

[30] Foreign Application Priority Data

Jul. 30, 1996 [JP] Japan ..................................... 8-200116

[51] Int. Cl.$^7$ ....................................................... C08K 9/06
[52] U.S. Cl. ........................... 523/209; 524/837; 524/861; 524/862; 528/15
[58] Field of Search ..................................... 524/837, 861, 524/862; 528/15; 523/209

[56] References Cited

U.S. PATENT DOCUMENTS

| | | |
|---|---|---|
| 4,743,670 | 5/1988 | Yoshida . |
| 4,761,454 | 8/1988 | Oba et al. . |
| 5,188,899 | 2/1993 | Matsumoto et al. ..................... 428/405 |
| 5,218,014 | 6/1993 | Matsumoto et al. ..................... 523/209 |
| 5,312,860 | 5/1994 | Mize et al. ............................... 524/493 |

FOREIGN PATENT DOCUMENTS

0433727A1  6/1991  European Pat. Off. .

*Primary Examiner*—David W. Wu
*Assistant Examiner*—Caixia Lu-Rutt
*Attorney, Agent, or Firm*—Sughrue, Mion, Zinn, Macpeak & Seas, PLLC

[57] ABSTRACT

A silicone emulsion composition is disclosed which comprises specific amounts of (A) a colloidal silica-silicone core/shell material comprising (a) from 80 to 5 wt % colloidal-silica cores and (b) from 20 to 95 wt % shells comprising a specific polyorganosiloxane containing ethylenically unsaturated groups, (B) a specific polyorganohydrogensiloxane, (C) a curing catalyst, (D) an emulsifying agent, and (E) water. Also disclosed is a process for producing a silicone powder which comprises bringing the silicone emulsion composition into contact with a liquid or a gas while heating the composition at a temperature of 25° C. or higher and keeping the same in a dispersed state to thereby cure the silicone in the form of a powder. The silicone emulsion composition can give an elastomer having excellent mechanical properties upon the removal of the volatile components by heating. The particulate silicone obtained by the process from the emulsion composition has excellent mechanical strength, a small particle diameter, good uniformity in shape, and excellent dispersibility.

5 Claims, No Drawings

SILICONE EMULSION COMPOSITION AND PROCESS FOR PRODUCING SILICONE POWDER THEREFROM

FIELD OF THE INVENTION

The present invention relates to a silicone emulsion composition which forms an elastomer having excellent mechanical properties upon the evaporation of the volatile components including water by heating. This invention further relates to a process for producing a silicone powder from the composition.

BACKGROUND OF THE INVENTION

Various silicone emulsion compositions have hitherto been proposed which form elastomers after the removal of water. For example, JP-B-38-860 proposes a silicone emulsion composition comprising a polydiorganosiloxane whose molecular chain has been blocked at each end with a hydroxyl group, a polyorganohydrogensiloxane, a poly(alkyl silicate), and a tin salt of a fatty acid. (The term "JP-B" as used herein means an "examined Japanese patent publication".) JP-B-57-57063 proposes a silicone emulsion composition comprising a polydiorganosiloxane whose molecular chain has been blocked at each end with a hydroxyl group, a silane having a functionality of 3 or higher, and a tin salt of a fatty acid. JP-B-58-17226 proposes a silicone emulsion composition comprising a polydiorganosiloxane whose molecular chain has been blocked at each end with a vinyl group, a polyorganohydrogensiloxane, and a platinum compound. Furthermore, JP-A-54-131661 proposes a silicone emulsion composition obtained by emulsion-polymerizing a cyclic organosiloxane with an organoalkoxysilane having a functional group. (The term "JP-A" as used herein means an "unexamined published Japanese patent application".)

However, the elastomers formed from those emulsion compositions have poor mechanical strength although they are excellent in heat resistance, water repellency, weatherability, transparency, etc. Those prior art emulsion compositions have therefore been unsuitable for use as, e.g., a coating material.

For improving the poor mechanical strength, several proposals have been made on techniques of adding a colloidal silica as a reinforcement. For example, JP-B-62-54824 discloses the addition of a tin salt of a fatty acid and an alkaline colloidal silica to an emulsion of a polydiorganosiloxane whose molecular chain terminals have been blocked with hydroxyl groups. In JP-A-61-16927 is disclosed the addition of an alkaline colloidal silica to a silicone emulsion obtained by the emulsion polymerization of a low degree of polymerization diorganosiloxane and blocked at each end with a hydroxyl group with an alkoxysilane having a functionality of 3 or higher.

However, the elastomers formed from the above prior art compositions by removing the water therefrom have insufficient interfacial adhesion between the colloidal silica and the polyorganosiloxane and have poor uniformity in dispersion of the colloidal silica. Thus, the reinforcing effect of the silica on the silicone is insufficient. The above emulsion compositions further have a drawback that the pH thereof should be kept in the range of from 9 to 12, in which the alkaline colloidal silica added is stable, in order to stably store the emulsion compositions over a prolonged period of time. This pH regulation is troublesome.

In order to mitigate the problem described above, JP-A-61-16929 and JP-A-61-271352 disclose a process for producing an emulsion which comprises emulsion-polymerizing a polyorganosiloxane having a low degree of polymerization and terminated at each end with a hydroxyl group with an alkoxysilane having a functionality of 3 or higher in the presence of an acid colloidal silica.

The above prior art process, however, has a drawback that it is difficult to conduct initial homogenization so as to convert a mixture of the starting-material siloxane and the colloidal silica into micelles each comprising the two ingredients. As a result, the reaction mixture gives an emulsion containing particles formed by the condensation of the siloxane with silica within micelles and, coexistent with these particles, siloxane and silica particles which have not participated in the condensation. Thus, a sufficient improvement in mechanical strength is not attained.

A further drawback of the emulsion compositions described in the references cited above is that they are not expected to cure so rapidly upon evaporation of the volatile components by heating.

On the other hand, attempts have been made in recent years to use a particulate silicone as a modifying additive for relieving the internal stress of various organic resins and for improving the impact strength thereof.

A conventionally employed process for producing a particulate silicone for the above use is to pulverize a silicone rubber either as it is or after freezing the same. However, this conventional process has problems, for example, that the production efficiency is low and that the rubber particles obtained have a wide range of large particle diameters, are irregular in shape, and have poor dispersibility and poor lubricity.

For mitigating the above problems, various methods have been proposed.

For example, JP-A-59-68333 and JP-A-63-17959 disclose a method comprising spraying a liquid silicone rubber composition in hot air to cure the rubber in the sprayed state to thereby obtain spherical cured particles. In JP-A-62-243621, JP-A-62-257939, JP-A-63-77942, and JP-A-63-202658 is disclosed a method which comprises converting a liquid silicone rubber composition into an aqueous emulsion or suspension and bringing the emulsion or suspension into contact with a high-temperature liquid or gas to cure the silicone to thereby obtain spherical particles.

However, the particulate materials obtained by the above methods have poor mechanical strength because they do not contain a reinforcing filler such as various silicas and fumed titanium oxide. These particulate materials hence have a drawback that when used as an additive for modifying organic resins, the particulate materials change in shape upon application of an external stress thereto and may finally break. If a reinforcing filler is incorporated into the liquid silicone rubber composition in order to mitigate the above drawback, this not only impairs flowability but also results in a particulate material having an increased particle diameter and irregular shapes due to the aggregative properties of the filler.

SUMMARY OF THE INVENTION

The present invention has been achieved under these circumstances.

One object of the present invention is to provide a silicone emulsion composition which contains a colloidal silica-silicone core/shell material as the main component and is capable of forming an elastomer having excellent mechanical properties upon removal of the volatile components by heating.

Another object of the present invention is to provide a process which is capable of yielding from the emulsion composition a particulate silicone having excellent mechanical strength, a small particle diameter, good uniformity in shape, and excellent dispersibility.

The silicone emulsion composition of the present invention comprises:

(A) 100 parts by weight of a colloidal silica-silicone core/shell material comprising
  (a) from 80 to 5 wt % of cores comprising a colloidal silica, and
  (b) from 20 to 95 wt % of shells comprising a polyorganosiloxane represented by the average compositional formula $$R^1_a SiO_{(4-a)/2} \quad (I)$$

wherein $R^1$'s each represent a substituted or unsubstituted monovalent hydrocarbon group having 1 to 8 carbon atoms and "a" is a number of from 1.80 to 2.20, provided that from 0.01 to 25% by mole of the $R^1$'s each is a group containing an ethylenically unsaturated group;

(B) a polyorganohydrogensiloxane having per molecule at least two units represented by the general formula $$R^2_b H_c SiO_{[4-(b+c)]/2} \quad (II)$$

wherein $R^2$'s may be the same or different and each represent a substituted or unsubstituted, monovalent hydrocarbon group having no ethylenically unsaturated group, b is an integer of from 0 to 2, and c is an integer of 1 or 2, provided that b+c is an integer of from 1 to 3, the amount of the polyorganohydrogensiloxane being such that the number of the silicon-bonded hydrogen atoms contained therein per ethylenically unsaturated group contained in ingredient (A) is from 0.01 to 100;

(C) from $1 \times 10^{-6}$ to 1 part by weight of a curing catalyst;
(D) from 1 to 20 parts by weight of an emulsifying agent; and
(E) from 50 to 1,000 parts by weight of water.

The process for producing a silicone powder from the above composition of the present invention comprises bringing the composition into contact with a liquid or a gas while heating the composition at a temperature of 25° C. or higher and keeping the same in a dispersed state to thereby cure the silicone in the form of a powder.

The colloidal silica-silicone core/shell material mainly comprises colloidal-silica cores each covered at least partly with a silicone. It may contain a slight amount of separated silicone particles and other particles.

The silicone composition according to the present invention can be produced as follows.

First, the following ingredients are subjected to emulsion polycondensation in the presence of an emulsifying agent:
  (a) a colloidal silica;
  (b-1) a polyorganosiloxane which has structural units represented by the general formula $$R^3_n SiO_{(4-n)/2} \quad (III)$$

wherein $R^3$ represents a substituted or unsubstituted, monovalent hydrocarbon group having 1 to 18 carbon atoms and containing no ethylenically unsaturated group, and n represents an integer of 0 to 3, the polyorganosiloxane containing no hydroxyl group and having 2 to 10 silicon atoms;
  (b-2) a polyorganosiloxane which has structural units represented by the general formula $$R^4_l R^5_m SiO_{(4-l-m)/2} \quad (IV)$$

wherein $R^4$ represents a substituted or unsubstituted monovalent hydrocarbon group having 1 to 18 carbon atoms and containing no ethylenically unsaturated group, $R^5$ represents a substituted or unsubstituted monovalent hydrocarbon group having 1 to 8 carbon atoms and containing an ethylenically unsaturated group, l is an integer of 0 to 2, and m is an integer of 1 to 3, provided that l+m is an integer of 1 to 3, and the polyorganosiloxane containing no hydroxyl group, having 2 to 10 silicon atoms, and contains one or more ethylenically unsaturated groups, and optionally
  (b-3) a silane compound having 1 to 4 alkoxy groups to prepare an aqueous emulsion of a colloidal silica-silicone core/shell material (A). Alternatively, ingredients (a) and (b-2) are polymerized in the same manner optionally together with ingredient (b-3) to prepare an aqueous emulsion of a colloidal silica-silicone core/shell material (A). Subsequently, either the polyorganohydrogensiloxane (B), which contains units represented by general formula (II), or an aqueous emulsion thereof separately prepared by mechanically emulsifying the same in an ordinary way in the presence of an emulsifying agent is added to and mixed with the aqueous emulsion of the core/shell material (A) together with a curing catalyst (C) to thereby obtain the silicone composition.

The aqueous silicone emulsion composition according to the present invention contains as the main component a core/shell material comprising colloidal-silica cores each covered with a silicone shell through siloxane bonds. Due to this structure, the reinforcing properties of the colloidal silica can be exhibited sufficiently and effectively. Evaporating the volatile components including water at room temperature or with heating finally gives a cured elastomer having excellent mechanical strength performance.

DETAILED DESCRIPTION OF THE INVENTION

The components of the aqueous silicone emulsion composition according to the present invention will be explained below.

The colloidal silica-silicone core/shell material of ingredient (A) used in the present invention is the main component for forming a cured elastomer after water removal. This core/shell material comprises colloidal silica particles, ingredient (a), each covered with a polyorganosiloxane, ingredient (b). More specifically, a simpler system of the core/shell material comprises three kinds of core/shell particles, i.e., (1) particles in which both ends of the polyorganosiloxane have been bonded to the silica surface through siloxane bonds, (2) particles in which one end of the polyorganosiloxane has been bonded to the silica surface through a siloxane bond and the other end has been blocked with a hydroxyl group, and (3) particles in which both ends of the polyorganosiloxane have been blocked with hydroxyl groups and which have no siloxane bonds between the polyorganosiloxane and the silica surface. Where a tri- or tetrafunctional alkoxysilane or a chain stopper is used, the core/shell material comprises a larger number of kinds of particles and has more complicated structures.

The proportion of the polyorganosiloxane shells of ingredient (b) in the colloidal silica-silicone core/shell material of ingredient (A) is selected in the range of from 20 to 95% by weight. If the proportion thereof is lower than 20% by weight, the emulsion composition gives a cured substance which has considerably reduced properties, e.g., a significantly lowered modulus, and is hence deficient in elastomeric properties. On the other hand, if the proportion thereof exceeds 95% by weight, the colloidal silica cannot sufficiently produce its reinforcing effect on the polyorganosiloxane, resulting in a cured elastomer deficient in mechanical properties.

The silicon-bonded organic groups of the polyorganosiloxane shells of ingredient (b) in the core/shell material of ingredient (A) are substituted or unsubstituted, monovalent hydrocarbon groups each having 1 to 8 carbon atoms. From 0.01 to 25% by mole of these organic groups each is a group containing an ethylenically unsaturated group.

Examples of the unsubstituted hydrocarbon groups containing no ethylenically unsaturated group include linear or branched alkyl groups such as methyl, ethyl, propyl, hexyl, octyl, decyl, hexadecyl, or octadecyl; aryl groups such as phenyl, naphthyl, or xenyl; aralkyl groups such as benzyl, β-phenylethyl, methylbenzyl, or naphthylmethyl; and cycloalkyl groups such as cyclohexyl or cyclopentyl.

Examples of the substituted hydrocarbon groups containing no ethylenically unsaturated group include the above-enumerated unsubstituted organic groups in which hydrogen atoms have been replaced with halogen atoms such as fluorine or chlorine. Specific examples thereof include 3,3,3-trifluoropropyl and 3-fluoropropyl.

Examples of the group containing an ethylenically unsaturated group include groups represented by the following general formulae.

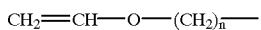  (V)

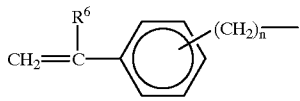  (VI)

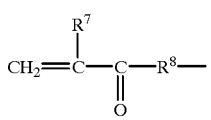  (VII)

Examples of the group containing an ethylenically unsaturated group further include a group represented by the following general formula.

$$CH_2=CH-(CH_2)_n-$$  (VIII)

In formulae (V) to (VIII) above, n represents an integer of 0 to 10.

Examples of the group containing an ethylenically unsaturated group represented by formula (V) above include vinyloxypropyl, vinyloxyethoxypropyl, vinyloxyethyl, and vinyloxyethoxyethyl. Preferred are vinyloxypropyl and vinyloxyethoxypropyl.

Where the ethylenically unsaturated group is represented by formula (VI) above, $R^6$ is a hydrogen atom or an alkyl group having 1 to 6 carbon atoms, preferably a hydrogen atom or an alkyl group having 1 or 2 carbon atoms, and more preferably a hydrogen atom or a methyl group. Examples of the group containing an ethylenically unsaturated group represented by this formula (VI) include vinylphenyl, 1-(vinylphenyl)ethyl, 2-(vinylphenyl)ethyl, (vinylphenyl)methyl, isopropenylphenyl, 2-(vinylphenoxy)ethyl, 3-(vinylbenzoyloxy)propyl, and 3-(isopropenylbenzoylamino)propyl. Preferred are vinylphenyl, 1-(vinylphenyl)ethyl, and 2-(vinylphenyl)ethyl.

Where the ethylenically unsaturated group is represented by formula (VII) above, $R^7$ is a hydrogen atom or a methyl group. $R^8$ is an alkylene group having 1 to 6 carbon atoms, —O—, —S—, or a group represented by —N($R^9$)$R^{10}$—, wherein $R^9$ is a hydrocarbon group having 1 to 6 carbon atoms or a (meth)acryloyl group and $R^{10}$ is an alkylene group having 1 to 6 carbon atoms. Examples of the group containing an ethylenically unsaturated group represented by this formula (VII) include γ-acryloxypropyl, γ-methacryloxypropyl, N-methacryloyl-N-methyl-γ-aminopropyl, N-acryloyl-N-methyl-γ-aminopropyl, and N,N-bis(methacryloyl)-γ-aminopropyl. Preferred are N-methacryloyl-N-methyl-γ-aminopropyl and N-acryloyl-N-methyl-γ-aminopropyl.

Examples of the group containing an ethylenically unsaturated group represented by formula (VIII) above include vinyl, allyl, homoallyl, 5-hexenyl, and 7-octenyl. Preferred are vinyl and allyl.

The content of these groups containing a carbofunctional group and an ethylenically unsaturated group is usually from 0.01 to 25% by mole, preferably from 0.05 to 5% by mole, based on the total amount of all $R^1$'s in average empirical formula (I).

$$R^1{}_aSiO_{(4-a)/2} \qquad (I)$$

If the content thereof is lower than 0.01%, the effect of improving the adhesive properties (adhesion or fixing) of the emulsion composition applied to a substrate, e.g., fibers, is lessened. In addition, when this emulsion composition is used to produce a silicone powder therefrom, the powder is reduced in dispersibility into and compatibility with various organic resins, rubbers, etc., and in interfacial bondability to such materials. On the other hand, if the content of those groups exceeds 25%, there is the possibility that the final cured substance may have too high a hardness. Where the cured substance is, e.g., a silicone powder and is used as a stress-relieving agent, its function is insufficient.

Other examples of the monovalent organic groups of ingredient (A)(b) include organic functional groups each constituted of carbon atoms, hydrogen atoms, and one or more atoms of at least one of nitrogen and oxygen. The emulsion composition in which ingredient (A) contains such organic functional groups is advantageous in that it shows excellent adhesive properties (adhesion or fixing) when applied to a substrate such as fibers. Furthermore, the silicone powder obtained from such an emulsion composition has excellent compatibility with various organic resins, rubbers, etc. and satisfactory interfacial adhesion properties, and is hence advantageously used as a modifier for modifying physical properties.

Examples of such organic functional groups include the following.

—$CH_2CH_2CH_2NH_2$

—$CH_2CH_2CH_2NHCH_2CH_2NH_2$

—$CH_2CH_2CH_2NHCH_2CH_2NHCH_2CH_2NH_2$

—$CH_2CH_2CH_2OCH_2CHCH_2$

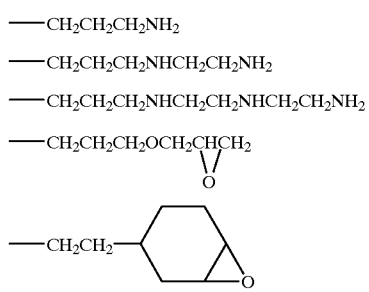

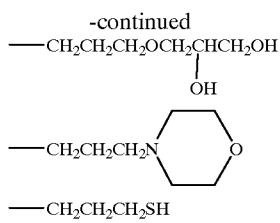

—CH$_2$CH$_2$CH$_2$SH

The polyorganosiloxane of ingredient (A)(b) preferably has a substantially linear molecular structure. "Substantially linear molecular structure" used herein is a general term for a linear structure and a slightly branched linear structure. The groups containing an ethylenically unsaturated group each may be located at a molecular chain terminal or in any position within the molecular chain. Where the polyorganosiloxane contains no ethylenically unsaturated group at a molecular chain terminal, the terminal is preferably blocked with a hydroxyl, alkoxy, trimethylsilyl, dimethylphenylsilyl, 3,3,3-trifluoropropyldimethylsilyl, or similar group.

Ingredient (B) used in the present invention is a polyorganohydrogensiloxane having, per molecule, at least two units represented by the general formula

wherein $R^2$, b, and c are the same as defined above. The silicon-bonded hydrogen atoms function as a crosslinking agent in the hydrosilylation reaction of ingredient (B) with ethylenically unsaturated groups of ingredient (A).

Ingredient (B) is not particularly limited in molecular structure, as long as it has, per molecule, two or more hydrogen atoms each directly bonded to a silicon atom. Although a polyorganohydrogensiloxane having a linear, cyclic, or branched siloxane backbone can be used, it is preferred to use a polyorganohydrogensiloxane which is linear or comprises $R^2{}_2HSiO_{1/2}$ units and $SiO_2$ units, from the standpoint of easiness of synthesis.

$R^2$'s may be the same or different and each represents a substituted or unsubstituted, monovalent hydrocarbon group having no ethylenically unsaturated bond. Examples of this group include alkyl groups such as methyl, ethyl, propyl, butyl, hexyl, octyl, decyl, or dodecyl; cycloalkyl groups such as cyclohexyl; aryl groups such as phenyl; and substituted monovalent hydrocarbon groups such as chloromethyl, 3,3,3-trifluoropropyl, or chlorophenyl. From the standpoint of easiness of synthesis, $R^2$'s are preferably methyl.

In the siloxane units other than those represented by formula (II) in ingredient (B), the silicon-bonded organic groups may be the same or different. Examples of these organic groups include the same groups as those enumerated above with regard to $R^2$. From the standpoint of easiness of synthesis, the organic groups are preferably methyl.

Ingredient (B) is incorporated in such an amount that the number of the silicon-bonded hydrogen atoms contained therein is from 0.01 to 100, and preferably from 0.1 to 10, per ethylenically unsaturated group contained in ingredient (A). If the number of the silicon-bonded hydrogen atoms is smaller than 0.01, the number of crosslinks is too small, resulting in a cured film having reduced mechanical strength. If the number of those hydrogen atoms exceeds 100, the emulsion composition gives a cured film which undergoes greater changes in properties (especially heat resistance).

The curing catalyst of ingredient (C) catalyzes the addition reaction of silicon-bonded hydrogen atoms of ingredient (B) with ethylenically unsaturated groups of ingredient (A).

This catalyst is not particularly limited, and examples thereof include cobalt, rhodium, nickel, palladium, and platinum compounds. Preferred among these are platinum compounds. Examples of the platinum compounds include chloroplatinic acid; solutions of the acid in alcohols or ketones; liquids obtained by ripening these solutions; complex compounds of chloroplatinic acid with olefins; complex compounds of chloroplatinic acid with alkenylsiloxanes; complex compounds of chloroplatinic acid with diketones; and supports having platinum black and platinum both fixed thereto.

The incorporation amount of the curing catalyst of ingredient (C) is from $1 \times 10^{-6}$ to 1 part by weight in terms of the amount of the metal as the main component of the curing catalyst per 100 parts by weight of the colloidal silica-silicone core/shell material of ingredient (A). If the incorporation amount of ingredient (C) is smaller than $1 \times 10^{-6}$ part by weight, the crosslinking reaction does not proceed sufficiently. On the other hand, even if ingredient (C) is incorporated in an amount exceeding 1 part by weight, this is uneconomical because a further enhancement in its effect is not expected.

The emulsifying agent of ingredient (D) serves not only to enable the colloidal silica-silicone core/shell material of ingredient (A) to be stably present in water, but also as a polycondensation catalyst in the formation of the core/shell material. This emulsifying agent is an anionic or cationic emulsifying agent.

Examples of the anionic emulsifying agent include organic sulfonic acid type emulsifying agents such as aliphatic-group-substituted benzenesulfonic acids, aliphatic-group-substituted naphthalenesulfonic acids, aliphatic sulfonic acids, silylalkylsulfonic acids, and aliphatic-group-substituted diphenyl ethersulfonic acids in each of which the aliphatic substituent has a carbon chain having a length of 6 to 18 carbon atoms. Preferred among these are aliphatic-group-substituted benzenesulfonic acids. It is however noted that although such an anionic emulsifying agent is used in the form of a sulfonic acid in the preparation of an emulsion of the colloidal silica-silicone core/shell material, the emulsifying agent in the composition of the present invention is present as a sulfonic acid salt because the emulsion is neutralized later with an alkali.

Examples of the cationic emulsifying agent include quaternary ammonium salt type emulsifying agents such as alkyltrimethylammonium salts, e.g., octadecyltrimethylammonium chloride and hexadecyltrimethylammonium chloride, dialkyldimethylammonium salts, e.g., dioctadecyldimethyl-ammonium chloride, dihexadecyldimethylammonium chloride, and didodecyldimethylammonium chloride, and benzalkonium chlorides, e.g., octadecyldimethylbenzylammonium chloride and hexadecyldimethylbenzylammonium chloride.

The incorporation amount of the emulsifying agent of ingredient (D) is usually from 1 to 20 parts by weight per 100 parts by weight of the colloidal silica-silicone core/shell material of ingredient (A). If the incorporation amount thereof is smaller than 1 part by weight, stable micelle formation is difficult. If the amount thereof exceeds 20 parts by weight, the emulsion obtained has an increased viscosity and is unstable.

Where the polyorganohydrogensiloxane of ingredient (B) is emulsified separately and then mixed with ingredient (A), ingredient (D) may further contain a nonionic emulsifying agent. For emulsifying ingredient (B) alone, it is preferred to use a nonionic emulsifying agent. Examples of this nonionic emulsifying agent include glycerol/fatty acid esters, sorbitan/fatty acid esters, polyoxyethylene (hereinafter abbreviated as POE) alkyl ethers, POE-sorbitan/fatty acid esters, POE-glycerol/fatty acid esters, POE alkylphenol ethers, and POE/polyoxypropylene block copolymers.

The incorporation amount of the water of ingredient (E) is usually from 50 to 1,000 parts by weight per 100 parts by weight of the core/shell material of ingredient (A). If the amount of ingredient (E) is smaller than 50 parts by weight or exceeds 1,000 parts by weight, the result is an unstable emulsion in which the particles are in a poorly emulsified state.

Processes for producing the silicone emulsion composition according to the present invention will be explained below.

A colloidal silica of ingredient (A) (a) is subjected to polycondensation with a polyorganosiloxane of ingredient (A) (b-1) and a polyorganosiloxane containing ethylenically unsaturated groups of ingredient (A)(b-2) and optionally with an alkoxysilane of ingredient (A)(b-3), or to polycondensation with ingredient (A) (b-2) and optionally with ingredient (A) (b-3), in an aqueous medium in the presence of an effective amount of either an emulsifying agent or a mixture of emulsifying agents, whereby a colloidal silica-silicone core/shell material emulsion is prepared. Subsequently, either the polyorganohydrogensiloxane of ingredient (B) or an aqueous emulsion thereof separately prepared by mechanically emulsifying the same in an ordinary way in the presence of an effective amount of at least one emulsifying agent is added to and mixed with the core/shell material emulsion together with a curing catalyst of ingredient (C). Thus, the aqueous silicone emulsion of the present invention is obtained.

The colloidal silica of ingredient (A)(a) used in the present invention means a dispersion in water of a particulate substance basically comprising $SiO_2$ units. Suitable for use in the present invention is a colloidal silica having an average particle diameter of from 4 to 300 nm, and preferably from 30 to 150 nm. Although such colloidal silicas include acid ones and alkaline ones, it is preferred to use an acid colloidal silica because the emulsion polymerization is conducted using an anionic emulsifying agent under acid conditions.

The organosiloxane of ingredient (A)(b-l) and the organosiloxane containing ethylenically unsaturated groups of ingredient (A)(b-2) both for use in the present invention have structural units represented by formulae (III) and (IV), respectively. These organosiloxanes contain no hydroxyl group and each has 1 to 10 silicon atoms. Although the molecular structure of these organosiloxanes is not particularly limited and may be a linear, branched, cyclic, or another structure, the organosiloxanes preferably have a cyclic structure.

If an organosiloxane having more than 10 silicon atoms is used to conduct emulsion polymerization, colloidal silica particles are less apt to be incorporated into siloxane micelles and, hence, part of the colloidal silica particles do not participate in the formation of a core/shell material. As a result, the emulsion obtained contains the target core/shell material and, coexistent therewith, free colloidal silica particles and polyorganosiloxane micelles. On the other hand, use of a hydroxylated siloxane is undesirable in that a polycondensation reaction occurs in the initial stage of emulsification to yield siloxanes having more than 10 carbon atoms and these siloxanes pose the problem described above.

Examples of the organosiloxane of ingredient (A)(b-1) described above include cyclic compounds such as hexamethylcyclotrisiloxane, octamethylcyclotetrasiloxane, decamethylcyclopentasiloxane, 1,3,5,7-tetramethyl-1,3,5,7-tetraphenylcyclotetrasiloxane, 1,3,5,7-tetrabenzyltetramethylcyclotetrasiloxane, and 1,3,5-tris(3,3,3-trifluoropropyl)trimethylcyclotetrasiloxane. These organosiloxanes are used alone or as a mixture of two or more thereof.

Examples of the organosiloxane containing ethylenically unsaturated groups of ingredient (A)(b-2) described above include cyclic compounds such as 1,3,5,7-tetravinyltetramethylcyclotetrasiloxane, octavinylcyclotetrasiloxane, 1,3,5-trivinyltrimethylcyclotrisiloxane, 1,3,5,7-tetraallyltetramethylcyclotetrasiloxane, 1,3,5,7-tetra(5-hexenyl)tetramethylcyclotetrasiloxane, 1,3,5,7-tetra(7-octenyl)tetramethylcyclotetrasiloxane, 1,3,5,7-tetra (vinyloxypropyl)tetramethylcyclotetrasiloxane, 1,3,5,7-tetra (vinyloxyethoxypropyl)tetramethylcyclotetrasiloxane, 1,3,5,7-tetra(p-vinylphenyl)tetramethylcyclotetrasiloxane, 1,3,5,7-tetra[1-(m-vinylphenyl)methyl] tetramethylcyclotetrasiloxane, 1,3,5,7-tetra[2-(p-vinylphenyl)-ethyl]tetramethylcyclotetrasiloxane, 1,3,5,7-tetra[3-(p-vinylphenoxy)propyl] tetramethylcyclotetrasiloxane, 1,3,5,7-tetra[3-(p-vinylbenzoyloxy)propyl]tetramethylcyclotetrasiloxane, 1,3,5,7-tetra[3-(p-isopropenylbenzoylamino)-propyl] tetramethylcyclotetrasiloxane, 1,3,5,7-tetra(γ-acryloxypropyl)tetramethylcyclotetrasiloxane,1,3,5,7-tetra (γ-methacryloxypropyl)tetramethylcyclotetrasiloxane, 1,3,5,7 -tetra(N-methacryloyl-N-methyl-γ-aminopropyl) tetramethylcyclotetrasiloxane, 1,3,5,7-tetra(N-acryloyl-N-methyl-γ-aminopropyl)tetramethylcyclotetrasiloxane, 1,3,5,7-tetra[N,N-bis(methacryloyl)-γ-aminopropyl] tetramethylcyclotetrasiloxane, and 1,3,5,7-tetra[N,N-bis (acryloyl)-γ-aminopropyl]tetramethylcyclotetrasiloxane. These organosiloxanes are used alone or as a mixture of two or more thereof.

Besides the cyclic compounds enumerated above, linear or branched organosiloxanes may be used. However, in the case of using a linear or branched siloxane, the siloxane is preferably one in which the molecular terminals have been blocked with not hydroxyl groups but organic groups such as alkoxy, trimethylsilyl, dimethylvinylsilyl, methylphenylvinylsilyl, methyldiphenylsilyl, or 3,3,3-trifluoropropyldimethylsilyl groups.

The alkoxysilane of ingredient (A)(b-3), which is used if desired, serves as a component of the shells. This ingredient is also effective in enhancing interfacial bonding between the colloidal-silica cores and the polyorganosiloxane shells.

Examples of the organic silane compound having 1 to 4 alkoxy groups include vinyltrimethoxysilane, vinyltriethoxysilane, vinyltripropoxysilane, vinyltributoxysilane, vinyltri(methoxyethoxy)silane, γ-methacryloxyethyltrimethoxysilane, γ-methacryloxyethyltriethoxysilane, γ-acryloxyethyltrimethoxysilane, γ-acryloxyethyltriethoxysilane, γ-methacryloxypropyltrimethoxysilane, γ-methacryloxypropyltriethoxysilane, γ-acryloxypropyltrimethoxysilane, γ-acryloxypropyltriethoxysilane, dimethylvinylmethoxysilane, dimethylvinylethoxysilane, methylvinyldimethoxysilane, methylvinyldiethoxysilane, tetramethoxysilane, tetraethoxysilane, tetrapropoxysilane, tetrabutoxysilane, methyltrimethoxysilane, methyltriethoxysilane, methyltripropoxysilane, methyltributoxysilane, ethyltrimethoxysilane, ethyltriethoxysilane, ethyltripropoxysilane, ethyltributoxysilane, propyltrimethoxysilane, propyltriethoxysilane, propyltripropoxysilane, propyltributoxysilane, dimethyldimethoxysilane, dimethyldiethoxysilane, dimethyldipropoxysilane, dimethyldibutoxysilane, diethyldimethoxysilane, diethyldiethoxysilane, diethyldipropoxysilane, diethyldibutoxysilane, methylethyltrimethoxysilane, methylpropyldiethoxysilane, diphenyldimethoxysilane, diphenyldiethoxysilane, phenyltrimethoxysilane, phenyltriethoxysilane, γ-glycidoxypropyltrimethoxysilane, γ-glycidoxypropylmethyldimethoxysilane, and fluorinated alkoxysilanes such as fluoroalkylalkoxysilanes.

The above-described polymerizable ingredients, i.e., the organosiloxane of ingredient (A)(b-1), the organosiloxane containing ethylenically unsaturated groups of ingredient (A)(b-2), and the alkoxysilane of ingredient (A)(b-3), are incorporated in such respective amounts that the content of the polyorganosiloxane shells in the colloidal silica-silicone core/shell material in the resultant composition according to the present invention is from 20 to 95% by weight, and that the polyorganosiloxane has the following average compositional formula (I):

$$R^1_a SiO_{(4-a)/2}$$

wherein $R^1$ is a substituted or unsubstituted monovalent hydrocarbon group having 1 to 8 carbon atoms and "a" is a number of from 1.80 to 2.20, provided that from 0.01 to 25% by mole of the $R^1$'s each is a group containing an ethylenically unsaturated group.

An organosilicon compound which has a carbofunctional group constituted of carbon atoms, hydrogen atoms, and one or more atoms of at least either of nitrogen and oxygen and further has one or more alkoxy groups may be added as ingredient (A)(b-3) for the purpose of improving the adhesive properties (adhesion or fixing) of the emulsion composition according to the present invention applied to substrates, e.g., fibers.

Examples of the organosilicon compound include 3-aminopropylmethyldimethoxysilane, N-(2-aminoethyl)-3-aminopropyltriethoxysilane, N-triethylenediaminepropylmethyldimethoxysilane, 3-glycidoxypropylmethyldiethoxysilane, and 3,4-epoxycyclohexylethyltrimethoxysilane. The addition amount of this organosilicon compound is usually up to 20% by weight, preferably up to 10% by weight, based on the total amount of ingredients (A)(b-1) and (A)(b-2).

As described above, the silicone emulsion composition according to the present invention is produced by mixing the colloidal silica of ingredient (A)(a), with shearing, with the organosiloxane of ingredient (A)(b-1) and the organosiloxane containing ethylenically unsaturated groups of ingredient (A) (b-2) optionally further with the alkoxysilane of ingredient (A)(b-3), or by mixing ingredient (A)(a), with shearing, with ingredients (A)(b-2) and (A)(b-3), in an aqueous medium in the presence of an emulsifying agent by means of a homogenizer or the like to thereby conduct polycondensation to yield a colloidal silica-silicone core/shell material.

The emulsifying agent used above not only functions as a surfactant for emulsifying all of ingredient (A)(b-1), ingredient (A)(b-2), and the colloidal silica-silicone core/shell material to be yielded, but serves as a catalyst for the polycondensation reactions of ingredient (A) (a), ingredient (A)(b-1), ingredient (A)(b-2), and ingredient (A)(b-3). Preferred anionic emulsifying agents for use in the polycondensation are organic sulfonic acid type emulsifying agents, while preferred cationic emulsifying agents are quaternary ammonium salt type emulsifying agents. However, in the case of using a quaternary ammonium salt type emulsifying agent, it is desirable to use the emulsifying agent in combination with an alkali catalyst such as sodium hydroxide or potassium hydroxide, because some kinds of quaternary ammonium salts reduce catalytic activity.

The use amount of the emulsifying agent is usually from 1 to 20 parts by weight, preferably about from 1 to 10 parts by weight, per 100 parts by weight of the total amount of ingredient (A)(a) and ingredients (A)(b-1), (A)(b-2), and (A)(b-3). If desired and necessary, a nonionic emulsifying agent may be used in combination with the anionic or cationic emulsifying agent.

In preparing the colloidal silica-silicone core/shell material, a combination of an acid colloidal silica and an anionic emulsifying agent or a combination of an alkaline colloidal silica and a cationic emulsifying agent is selected in order to keep the colloidal silica stable.

The use amount of the water in the preparation of the core/shell material is usually from 50 to 1,000 parts by weight, preferably from 100 to 500 parts by weight, per 100 parts by weight of the total amount of ingredient (A)(a) and ingredients (A)(b-1), (A)(b-2), and (A)(b-3). The condensation is usually conducted at a temperature of from 5 to 100° C.

A crosslinking agent can be added as the fourth ingredient in the preparation of the colloidal silica-silicone core/shell material in the composition according to the present invention in order to improve the strength of the silicone shells. Examples of this crosslinking agent include trifunctional crosslinking agents such as trimethoxysilane, methyltrimethoxysilane, vinyltrimethoxysilane, methyltriethoxysilane, phenyltrimethoxysilane, ethyltriethoxysilane, and (3,3,3-trifluoropropyl) trimethoxysilane and tetrafunctional crosslinking agents such as tetraethoxysilane. The addition amount of this crosslinking agent is usually up to 10% by weight, preferably up to 5% by weight, based on the total amount of ingredients (A)(b-1), (A)(b-2), and (A)(b-3).

Since the thus-obtained colloidal silica-silicone core/shell material emulsion in the composition according to the present invention is acid or alkaline, it should be neutralized with an alkali or an acid in order to maintain long-term stability. Usable examples of the alkaline substance include sodium hydroxide, potassium hydroxide, sodium carbonate, sodium hydrogen carbonate, and triethanolamine. Usable examples of the acid include hydrochloric acid, sulfuric acid, nitric acid, acetic acid, and oxalic acid.

The organohydrogensiloxane of ingredient (B) for use in the present invention is not particularly limited in molecular structure, as long as it has, per molecule, two or more structural units represented by formula (II) described hereinabove. Although a polyorganohydrogensiloxane having a linear, cyclic, or branched siloxane backbone can be used, it is preferred to use a linear polyorganohydrogensiloxane or a branched polyorganohydrogensiloxane comprising $R^2_2HSiO_{1/2}$ units and $SiO_2$ units, from the standpoint of easiness of synthesis.

Ingredient (B) may be directly added to and mixed with the emulsion of ingredient (A). If desired, however, it is possible to prepare an aqueous emulsion of ingredient (B) beforehand by mixing the same with an aqueous medium with shearing in the presence of an emulsifying agent by means of a homogenizer or the like and to mix this emulsion with the emulsion of ingredient (A). The emulsifying agent used in this case functions as a surfactant for emulsifying mainly ingredient (B). This emulsifying agent is preferably a nonionic emulsifying agent because use of an anionic emulsifying agent necessitates neutralization in a later stage. Examples of the nonionic emulsifying agent include the same nonionic emulsifying agents as those enumerated above. Preferred among those are POE alkylphenol ethers. The use amounts of this emulsifying agent and water are as follows. The total amount of the emulsifying agent used for ingredient (B) and that used for ingredient (A) is within the range specified hereinabove; the amount of the emulsifying agent is preferably from 1 to 10 parts by weight per 100 parts by weight of ingredient (B). The total amount of the water used for ingredient (B) and that used for ingredient (A) is within the range specified hereinabove; the amount of the water is preferably from 100 to 500 parts by weight per 100 parts by weight of ingredient (B). The emulsification is conducted at a temperature of usually from 5 to 100° C.

Ingredient (B) as it is or an emulsion thereof and a curing catalyst of ingredient (C) are added in respective necessary amounts to the above-described emulsion of ingredient (A), and the resultant mixture is homogenized by stirring. Thus, the production of the silicone emulsion composition of the present invention is completed. The curing catalyst used in the present invention is preferably a platinum compound as stated hereinabove. If desired and necessary, a platinum catalyst inhibitor may be used in combination with the catalyst. The curing catalyst and the inhibitor therefor are desirably used after being converted to an O/W or W/O emulsion in an ordinary way using an emulsifying agent and water. The addition of the curing catalyst and the subsequent mixing by stirring are preferably conducted at a temperature of from 5 to 25° C.

The silicone emulsion according to the present invention is stable for about 2 months after the production or preparation thereof. In the case where a longer storage period is desired, the curing catalyst is preferably stored separately from the other ingredients and mixed therewith just before use.

Other ingredients such as a reinforcing filler, stabilizer, pigment, modifier, and flame retardant may be further incorporated. For the purpose of regulating the silicone emulsion so as to have a viscosity suitable for coating, a thickening agent may be used or water may be added for dilution.

Examples of the flame retardant include aluminum hydroxide, magnesium hydroxide, and zinc carbonate.

A conventional adhesion aid such as an organosilicon compound having both one or more carbofunctional groups and one or more hydrolyzable groups in the molecule may be added to the silicone emulsion composition of the present invention in order to improve the adhesion of the composition to substrates such as fibers. Examples of such organosilicon compounds include 3-glycidoxypropyltrimethoxysilane, 3-aminopropyltrimethoxysilane, N-(2-aminoethyl)-3-aminopropyltrimethoxysilane, 3,4-epoxycyclohexylethyltrimethoxysilane, 3-mercaptopropyltrimethoxysilane, 3-chloropropyltrimethoxysilane, and the organosilicon compound represented by the following structural formula.

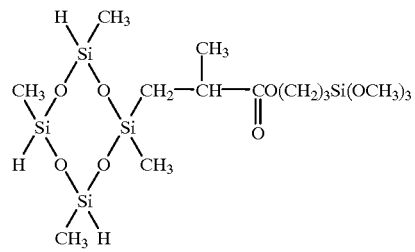

These organosilicon compounds can be used alone or as a mixture of two or more thereof.

The silicone emulsion composition thus obtained can be used as it is in applications where a silicone coating film having excellent mechanical strength is required, such as, e.g., a coating material, a treatment for fibers, a release agent, a treatment for release papers or for the back of tacky substances, and a binder for inorganic substances. Besides being usable in such applications, the emulsion composition is used for the production of a silicone powder as explained below.

The process for producing a silicone powder from the above-described silicone emulsion composition according to the present invention is explained below.

This process comprises bringing the silicone emulsion composition according to the present invention into contact with a liquid or gaseous medium having a temperature of 25° C. or higher while keeping the composition in a dispersed state to thereby cure the colloidal silica-silicone core/shell material as the main component of the composition into fine particles. If the temperature of the liquid or gaseous medium is lower than 25° C., the curing rate for the core/shell material is too low to obtain a satisfactory silicone powder having desired properties. The temperature of the liquid or gaseous medium is especially preferably not lower than 50° C. The liquid is not particularly limited as long as the core/shell material neither dissolves therein nor is inhibited thereby from curing. Examples thereof include liquid paraffins, waxes, dimethyl silicone oils, and phthalic esters. The gas also is not particularly limited as long as the core/shell material neither dissolves therein nor is inhibited thereby from curing. It is however desirable not to use a flammable gas. Preferred examples of the gas include air, nitrogen gas, and various noncombustible gases.

For bringing the silicone emulsion composition into contact with a liquid or gaseous medium having a temperature of 25° C. or higher while keeping the composition in a dispersed state to thereby cure the colloidal silica-silicone core/shell material of the composition into a powder, use may be made, for example, of: a method comprising spraying the composition in high-temperature air to complete curing; a method in which the composition is continuously fed at a low rate to a mixing vessel equipped with a stirrer and filled with a heating medium having a regulated temperature, and the contents are continuously stirred to keep the composition in a dispersed state and in contact with the heating medium; or a method in which a heating liquid is added to the composition and the resultant mixture is stirred.

In the silicone powder production according to the present invention, the ordinary way is to bring the silicone emulsion composition, just after the preparation thereof, into contact with a high-temperature liquid or gas to cure the silicone to thereby obtain a silicone powder. It is however possible to heat the emulsion composition beforehand to partly conduct the radical reactions or complete all radical reactions, before the composition is contacted with a liquid or gas. This method can yield the same silicone powder.

The silicone powder thus obtained is used either alone or in combination with one or more other materials, in various applications. Where the silicone powder is used in combination with other materials, the incorporation of the silicone powder into various materials is effective in improving physical properties thereof, e.g., mechanical strength, water resistance, and lubricity.

In the above case, the silicone powder is applicable to, for example, the following products and materials. However, the applications of the powder should not be construed as being limited thereto. Possible applications of the silicone powder include solid lubricants, water repellents, release agents, antitack agents, greases, oils, cements, plasters, coating materials, potting materials, molding materials, films, agricultural chemicals, and medical uses. In particular, in the case where the silicone powder is incorporated into a polymeric material, examples of the polymer include rubbers such as natural rubber, polychloroprene rubber, polybutadiene rubber, SBR, EPR, EPT rubbers, polyisoprene rubber, polyisobutene rubber, poly(acrylic ester) rubbers, polyurethane rubbers, butadiene/acrylonitrile copolymer rubbers, polyester rubbers, polysulfide rubbers, fluororubbers, silicone rubbers, rubbers comprising copolymers of two or more of these, and mixtures of two or more of these; and various thermoplastic and thermosetting resins and resins curable with high-energy rays such as ultraviolet rays, $\gamma$ rays, or electron beams. Specific examples of such resin materials include various polyamides represented by nylon-5, nylon-6, nylon-7, nylon-8, nylon-9, nylon-10, nylon-11, nylon-12, nylon-66, and aromatic polyamides such as Kevlar, saturated polyesters represented by poly (ethylene terephthalate), poly(butylene terephthalate), poly (hydrogenated xylylene terephthalate), polycaprolactone, and polypivalolactone, polycarbonates, ABS resins, AS resins, polystyrene, polyethylene, polypropylene, polybutadiene, poly(vinyl chloride), poly(vinylidene chloride), polyacrylonitrile, poly(vinyl alcohol), poly(vinyl acetate), poly(vinyl butyral), poly(methyl methacrylate), fluororesins, other polyolefin resins, polyethers such as poly(ethylene glycol), poly(propylene glycol), polytetrahydrofuran, Penton, poly(phenylene oxide), and polyacetal, phenol resins, polyurethane resins, acrylic resins, urea resins, unsaturated polyester resins, melamine resins, phthalic acid resins, BT resins, polyimide resins, silicone resins, celluloid, acetyl cellulose, epoxy acrylates, poly (acrylic acid salt)s, epoxy resins, and block or random copolymers or blends of two or more of these resins. It is a matter of course that these resins may contain various powdery inorganic fillers, fibrous fillers or reinforcements, e.g., glass fibers or carbon fibers, heat resistance improvers, weathering agents, other stabilizers, modifiers, pigments, dyes, etc.

As described above, since the silicone emulsion composition according to the present invention contains as the main component a core/shell material comprising colloidal-silica cores each covered with a silicone shell through siloxane bonds, the colloidal silica can exhibit its reinforcing properties sufficiently and effectively. Therefore, by evaporating the volatile components including water at room temperature or with heating, a cured elastomer having excellent mechanical strength is obtained.

The process according to the present invention is effective in yielding a silicone powder having excellent mechanical strength, a small particle diameter, good uniformity in particle shape, and excellent dispersibility.

The present invention will be explained below in more detail by reference to Examples and Comparative Examples, but the invention should not be construed as being limited to these Examples.

In the following Examples, all "parts" and "percents" are by weight.

The average particle diameter of each of the colloidal silicas used as starting materials and the colloidal silica-silicone core/shell materials obtained as intermediates was measured with laser particle diameter analyzing system LPA-3000S/3100, manufactured by Otsuka Denshi Co., Ltd., Japan, which is based on the dynamic light scattering method.

Where each colloidal silica-silicone core/shell material as an intermediate was regarded as a graft polymer in which the colloidal-silica cores served as a backbone polymer and the shells as a branch polymer, a graft percentage and a graft efficiency were determined as follows. An emulsion containing the core/shell material was dried at 40° C. for 5 hours at a reduced pressure of 0.5 mmHg. A given weight (l) of the dry core/shell material thus obtained was placed in cyclohexane, and the resultant mixture was shaken with a shaking apparatus for 2 hours to dissolve free polyorganosiloxanes. The mixture was then centrifuged with a centrifugal separator at a rotational speed of 23,000 rpm for 30 minutes to obtain an insoluble matter. Subsequently, the insoluble matter was dried at 120° C. for 1 hour with a vacuum dryer to determine the weight of the insoluble matter (m). The graft percentage and the graft efficiency were then calculated using the following equations.

$$\text{Graft percentage} = \frac{(m) - (l) \times (\text{core content of core/shell material})}{(l) \times (\text{core content of core/shell material})} \times 100$$

$$\text{Graft efficiency} = \frac{(m) - (l) \times (\text{core content of core/shell material})}{(l) - (l) \times (\text{core content of core/shell material})} \times 100$$

EXAMPLE 1

To a liquid mixture of 1,000 parts of acid colloidal silica Snowtex OL (manufactured by Nissan Chemical Industries, Ltd., Japan; average particle diameter: 84 nm, $SiO_2$: 20.66%, $Na_2O$: 0.019%, pH: 2.78; referred to as "silica 1"), 470 parts of distilled water, and 8.4 parts of dodecylbenzenesulfonic acid (referred to as "emulsifier 1") were added 210 parts of octamethylcyclotetrasiloxane (referred to as "b-1") and 1.2 parts of 1,3,5,7-tetravinyltetramethylcyclotetrasiloxane (referred to as "b-2"). This mixture was preliminarily stirred with a homomixer and then treated twice with a homogenizer at a pressure of 300 kgf/cm² to conduct emulsification and dispersion.

This dispersion was transferred to a separable flask equipped with a condenser, a nitrogen introduction opening, and a stirrer. The contents were heated at 85° C. for 5 hours with stirring and then cooled at 5° C. for 48 hours to complete polymerization. The resulting polyorganosiloxane emulsion was neutralized with an aqueous sodium carbonate solution to adjust the pH thereof to 7.0 to thereby terminate the polymerization. The conversion of the octamethylcyclotetrasiloxane and 1,3,5,7-tetravinyltetramethylcyclotetrasiloxane into the polyorganosiloxane obtained was 99.4%.

The polyorganosiloxane obtained above was ascertained to be a colloidal silica-silicone core/shell material through particle diameter analysis based on the dynamic light scattering method and through electron microscopy. Namely, particle diameter analysis with the laser particle diameter analyzer system (LPA-3000 S/3100, manufactured by Otsuka Denshi Co., Ltd.) revealed that the monodisperse particle diameter distribution of the starting colloidal silica, which had the peak at around 84 nm, had disappeared completely and a monodisperse particle diameter distribution having the peak at around 153 nm had newly appeared. Furthermore, in an examination with an electron microscope, silicone particle images only were observed and no images of starting silica particles were observed at all.

On the other hand, part of the core/shell material emulsion was placed in a large amount of acetone to coagulate the core/shell material. The coagulated core/shell material was taken out by filtration and dried at 50° C. for 12 hours with a vacuum dryer to obtain core/shell material coagulates. The core/shell material coagulates were examined by elemental analysis, IR spectrometry, and $^1$H and $^{29}$Si-NMR spectrometry. As a result, the proportion of the silicone shells was found to be 49.7%. Furthermore, the core/shell material, when regarded as a graft polymer, was found to have a graft percentage of 41.7% and a graft efficiency of 41.7%. The emulsion prepared above is referred to as a main ingredient.

To a liquid mixture consisting of 2.0 parts of polyoxyethylene(18) nonylphenyl ether (NIKKOL NP-18TX, manufactured by Nikko Chemicals Co., Ltd., Japan; HLB, 19) and 320 parts of distilled water was added 100 parts of a polymethylhydrogensiloxane having a viscosity of 25 cSt and represented by the following formula.

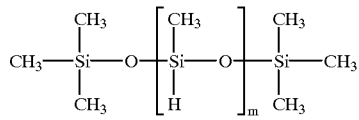

This mixture was preliminarily stirred with a homomixer and then treated twice with a homogenizer at a pressure of 300 kgf/cm$^2$ to conduct emulsification and dispersion. The resulting emulsion is referred to as "hardener a".

To 100 parts of the main ingredient prepared above (solid content: 24%) were subsequently added at 25° C. 0.40 part of hardener a (solid content: 24%) (the addition amount corresponds to two directly silicon-bonded hydrogen atoms per ethylenically unsaturated group) and 0.05 parts of an O/W emulsion of a chloroplatinic acid/olefin complex salt (platinum content of the emulsion: 3 wt %). This mixture was homogenized by stirring to obtain a silicone emulsion composition.

The silicone emulsion composition was poured into a mold coated with a fluororesin and then heated at 150° C. for 2 hours. Thus, casting and vulcanization were conducted to obtain a rubbery sheet having a thickness of about 1 mm. This rubbery sheet was evaluated for hardness, tensile strength, tensile stress at 100% elongation, and elongation in accordance with JIS K 6301. The results obtained are shown in Table 1.

The silicone emulsion composition obtained above was cast on the various substrates shown in Table 1 and then heated under the same conditions. As a result, a rubbery sheet was obtained on each of the various substrates. The adhesion of the rubbery sheet to each substrate was examined, and the results obtained are shown in Table 1.

[Judgement on Adhesion]

One end of the rubbery sheet formed on a substrate was pulled in a direction almost perpendicular to the substrate surface at a rate of about 300 mm/min, during which pulling the states of the rubbery sheet and substrate were examined. The degree of adhesion was evaluated based on the following criteria.

⊚ . . . Excellent adhesion; the rubbery sheet broke with no interfacial debonding.

○ . . . Interfacial debonding occurred, but a considerable force was required for peeling.

Δ . . . Interfacial debonding occurred with a force slightly weaker than that in ○ above.

x . . . interfacial debonding occurred with a weak force.

Furthermore, the silicone emulsion composition prepared above was allowed to stand at room temperature for 24 hours to age the same. The aged composition was sprayed with spray dryer DL-41 (trade name; manufactured by Yamato Kagaku K. K., Japan) under the conditions of an inlet temperature of 250° C., an outlet temperature of 100° C., and a spraying rate of 1 l/hr to cure the colloidal silica-silicone core/shell material. As a result, a silicone powder was obtained in the product receiver placed at the bottom of the cyclone. The yield was 91.7%. An examination of this silicone powder with an electron microscope revealed that the powder was composed of nearly true spherical particles having an average particle diameter of 2.7 μm.

Subsequently, 10 parts of the silicone powder was mixed with 100 parts of poly(butylene terephthalate) having an intrinsic viscosity [η] of 1.05 to prepare a thermoplastic resin composition. This composition was extruded into pellets using a twin-screw extruder at a cylinder temperature of 230° C. Some of the pellets obtained were broken, and the surfaces formed by the breakage were examined with a scanning electron microscope. As a result, it was ascertained that silicone particles were evenly dispersed in the resin layer and that the particles retained the intact spherical shape which was the same as that prior to the mixing.

The pellets obtained above were injection-molded at a cylinder temperature of 230° C. and a mold temperature of 60° C. to produce test pieces for property evaluation. The test pieces were subjected to an impact resistance test, and the results of the test are shown in Table 1. In the impact resistance test, the Izod impact strength of the test pieces having a ¼ " notch was measured in accordance with ASTM D256 at a temperature of 23° C.

EXAMPLES 2 AND 3

Polyorganosiloxane emulsions were prepared under the same conditions as in Example 1, except that the proportions of the ingredients were changed. Through particle diameter analysis based on dynamic light scattering and through an examination with an electron microscope, the polyorganosiloxanes obtained each was ascertained to be a colloidal silica-silicone core/shell material having a monodisperse particle diameter distribution. These core/shell materials were evaluated in the same manner as in Example 1, and the results obtained are shown in Table 1.

Subsequently, the same hardener a (solid content, 24%) and the same O/W emulsion of a chloroplatinic acid/olefin complex salt as those used in Example 1 were added to each of the above aqueous core/shell material emulsions in the same manner as in Example 1, except that the addition amounts thereof were changed. Thus, silicone emulsion compositions were obtained.

The silicone emulsion compositions thus obtained were vulcanized and cured in the same manner as in Example 1 to produce rubbery sheets, which were examined for properties. The results obtained are shown in Table 1.

The silicone emulsion compositions were further cast on various substrates and vulcanized and cured, in the same manner as in Example 1. The rubbery sheet thus obtained on each of the various substrates was examined for adhesion to the substrate in the same manner as in Example 1, and the results obtained are shown in Table 1.

Furthermore, the silicone emulsion compositions were sprayed and cured in the same manner as in Example 1 to obtain silicone powders. The silicone powders obtained were examined for various properties. The silicone powders each was mixed with poly(butylene terephthalate) and the mixture was extruded into pellets, under the same conditions as in Example 1. The pellets were subjected to the same evaluation as in Example 1. The results obtained are shown in Table 1.

EXAMPLE 4

A polyorganosiloxane emulsion was prepared using the same formulation and conditions as in Example 1, except that Snowtex OZL (manufactured by Nissan Chemical Industries, Ltd.; average particle diameter: 122 nm, $SiO_2$, 21.14%, $Na_2O$: 0.101%, pH: 2.02; referred to as "silica 2") was used as an acid colloidal silica. Through particle diameter analysis based on dynamic light scattering and through an examination with an electron microscope, the polyorganosiloxane obtained was ascertained to be a colloidal silica-silicone core/shell material having a monodisperse particle diameter distribution. This core/shell material was evaluated in the same manner as in Example 1, and the results obtained are shown in Table 1.

Subsequently, the same hardener a and the same O/W emulsion of a chloroplatinic acid/olefin complex salt as those used in Example 1 were added to the above aqueous core/shell material emulsion in the same amounts under the same conditions as in Example 1. Thus, a silicone emulsion composition was obtained.

The silicone emulsion composition thus obtained was vulcanized and cured in the same manner as in Example 1 to produce a rubbery sheet, which was examined for properties. The results obtained are shown in Table 1.

The silicone emulsion composition was further cast on various substrates and vulcanized and cured, in the same manner as in Example 1. The rubbery sheet thus obtained on each of the various substrates was examined for adhesion to the substrate in the same manner as in Example 1, and the results obtained are shown in Table 1.

Furthermore, the silicone emulsion composition was sprayed and cured in the same manner as in Example 1 to obtain a silicone powder. The silicone powder obtained was examined for various properties. The silicone powder was mixed with poly(butylene terephthalate) and the mixture was extruded into pellets, under the same conditions as in Example 1. The pellets were subjected to the same evaluation as in Example 1. The results obtained are shown in Table 1.

TABLE 1

| | | Example | | | |
|---|---|---|---|---|---|
| | | 1 | 2 | 3 | 4 |
| Composition of Core/shell Material Emulsion | Silica 1 | 1000 | 1000 | 1000 | |
| | Silica 2 | | | | 1000 |
| | Silica 3 | | | | |
| | b-1 | 210 | 420 | 105 | 210 |
| | b-2 | 1.2 | 2.4 | 0.6 | 1.2 |
| | b-3a | | | | |
| | b-3b | | | | |
| | b-3c | | | | |
| | b-3d | | | | |
| | b-3e | | | | |
| | Emulsifier 1 | 8.4 | 12.6 | 6.3 | 8.4 |
| | Emulsifier 2 | | | | |
| | Distilled water | 470 | 1100 | 155 | 470 |
| | Potassium hydroxide | | | | |
| Conversion of Cyclic Siloxanes (%) | | 99.4 | 99.6 | 99.2 | 99.4 |
| Core/shell Material | Average particle diameter [nm] | 153 | 180 | 122 | 175 |
| | Particle diameter distribution | monodisperse | monodisperse | monodisperse | monodisperse |
| | Proportion of shells [%] | 49.7 | 66.1 | 32.9 | 49.3 |
| | Graft percentage [%] | 41.7 | 38.7 | 37.6 | 40.3 |
| | Graft efficiency [%] | 41.7 | 19.3 | 74.9 | 40.3 |
| Composition of Silicone Composition | Aqueous core/shell material emulsion | 100 | 100 | 100 | 100 |
| | Hardener a | 0.4 | 0.5 | 0.3 | 0.4 |
| | Hardener b | | | | |
| | Chloroplatinic acid/olefin salt emulsion C-1 | 0.05 | 0.05 | 0.05 | 0.05 |

TABLE 1-continued

| | | Example | | | |
|---|---|---|---|---|---|
| | | 1 | 2 | 3 | 4 |
| | C-2 | | | | |
| Stability of Composition (25° C., 3 months) | | no change | no change | no change | no change |
| Rubber Properties | Hardness (JIS A) | 51 | 43 | 81 | 52 |
| | Tensile strength [kgf/cm$^2$] | 38 | 23 | 38 | 36 |
| | Tensile stress at 100% elongation [kgf/cm$^2$] | 12 | 10 | 15 | 12 |
| | Elongation [%] | 280 | 300 | 260 | 260 |
| Adhesion to Substrates | Concrete | ⊚ | ⊚ | ○ | ⊚ |
| | Mortar | ○ | ○ | ○ | ○ |
| | Glass | Δ | Δ | Δ | Δ |
| | Wood | ○ | ⊚ | ○ | ○ |
| | Steel sheet | Δ | Δ | Δ | Δ |
| | Paper | ⊚ | ⊚ | ⊚ | ⊚ |
| | Nylon fabric | ○ | ○ | ○ | ⊚ |
| Yield of Silicone Powder | | 90.5 | 93.1 | 90.4 | 92.6 |
| Properties of Silicone Powder | Average particle diameter [μm] | 2.8 | 2.6 | 3.1 | 3.5 |
| | Particle shape | spherical | spherical | spherical | spherical |
| Composition of Resin Composition | Silicone powder | 10 | 10 | 10 | 10 |
| | Poly(butylene terephthalate) | 100 | 100 | 100 | 100 |
| Properties of Resin Composition | Dispersed state of powder particles evenness of dispersion) | even | even | even | even |
| | Particle shape | spherical | spherical | spherical | spherical |
| | Interfacial adhesion of particles | good | good | good | good |
| | Izod impact strength [kg·cm/cm] | 19.8 | 25.6 | 17.1 | 18.3 |

EXAMPLES 5 AND 6

Polyorganosiloxane emulsions were prepared using the same formulation and conditions as in Example 1, except that 4.2 parts of 3-aminopropylmethyldimethoxysilane (referred to as b-3a) (Example 5) or 3-glycidoxypropylmethyldimethoxysilane (referred to as B-3b) (Example 6) was added beforehand to the octamethylcyclotetrasiloxane (referred to as b-1) and 1,3,5,7-tetravinyltetramethylcyclotetrasiloxane (referred to as b-2) used in Example 1.

Through particle diameter analysis based on dynamic light scattering and through an examination with an electron microscope, the polyorganosiloxane emulsions obtained each was ascertained to be a colloidal silica-silicone core/shell material having a monodisperse particle diameter distribution. These core/shell materials were evaluated in the same manner as in Example 1, and the results obtained are shown in Table 2.

Subsequently, the same hardener a and the same O/W emulsion of a chloroplatinic acid/olefin complex salt as those used in Example 1 were added to each of the above aqueous core/shell material emulsions in the same amounts under the same conditions as in Example 1. Thus, silicone emulsion compositions were obtained.

The silicone emulsion compositions thus obtained were vulcanized and cured in the same manner as in Example 1 to produce rubbery sheets, which were examined for properties. The results obtained are shown in Table 2.

The silicone emulsion compositions were further cast on various substrates and vulcanized and cured, in the same manner as in Example 1. The rubbery sheet thus obtained on each of the various substrates was examined for adhesion to the substrate in the same manner as in Example 1, and the results obtained are shown in Table 2.

Furthermore, the silicone emulsion compositions were sprayed and cured in the same manner as in Example 1 to obtain silicone powders. The silicone powders obtained were examined for various properties. The silicone powders each was mixed with poly(butylene terephthalate) and the mixture was extruded into pellets, under the same conditions as in Example 1. The pellets were subjected to the same evaluation as in Example 1. The results obtained are shown in Table 2.

EXAMPLES 7 AND 8

To a liquid mixture of 1,000 parts of alkaline colloidal silica Snowtex 20L (manufactured by Nissan Chemical Industries, Ltd.; average particle diameter: 72 nm, SiO$_2$: 20.31%, Na$_2$O: 0.022%, pH, 9.93; referred to as "silica 3"), 470 parts of distilled water, 30 parts of dioctadecyldimethylammonium chloride, and 6.0 parts of potassium hydroxide was added a mixture of 210 parts of octamethylcyclotetrasiloxane (referred to as "b-1"), 1.2 parts of 1,3,5,7-tetravinyltetramethylcyclotetrasiloxane (referred to as "b-2"), and 4.2 parts of 3-mercaptopropylmethyldimethoxysilane (referred to as "b-3c") (Example 7) or 3-glycidoxypropylmethyldimethoxysilane (referred to as "b-3d") (Example 8). Polyorganosiloxane emulsions were prepared under the same conditions as in Example 1 (hydrochloric acid was used for neutralization).

Through particle diameter analysis based on dynamic light scattering and through an examination with an electron microscope, the polyorganosiloxane emulsions obtained each was ascertained to be a colloidal silica-silicone core/shell material having a monodisperse particle diameter distribution. These core/shell materials were evaluated in the same manner as in Example 1, and the results obtained are shown in Table 2.

Subsequently, the same hardener a and the same O/W emulsion of a chloroplatinic acid/olefin complex salt as those used in Example 1 were added to each of the above aqueous core/shell material emulsions in the same amounts under the same conditions as in Example 1. Thus, silicone emulsion compositions were obtained.

The silicone emulsion compositions thus obtained were vulcanized and cured in the same manner as in Example 1 to produce rubbery sheets, which were examined for properties. The results obtained are shown in Table 2.

The silicone emulsion compositions were further cast on various substrates and cured, in the same manner as in Example 1. The rubbery sheet thus obtained on each of the various substrates was examined for adhesion to the substrate in the same manner as in Example 1, and the results obtained are shown in Table 2.

Furthermore, the silicone emulsion compositions were sprayed and cured in the same manner as in Example 1 to obtain silicone powders. The silicone powders obtained were examined for various properties. The silicone powders each was mixed with poly(butylene terephthalate) and the mixture was extruded into pellets, under the same conditions as in Example 1. The pellets were subjected to the same evaluation as in Example 1. The results obtained are shown in Table 2.

EXAMPLE 9

A polyorganosiloxane emulsion was prepared using the same formulation and conditions as in Example 1, except that 1.2 parts of vinylmethyldimethoxysilane (referred to as b-3e) was added in place of 1,3,5,7-tetravinyltetramethylcyclotetrasiloxane to octamethylcyclotetrasiloxane (referred to as b-1).

Through particle diameter analysis based on dynamic light scattering and through an examination with an electron microscope, the polyorganosiloxane emulsion obtained was ascertained to be a colloidal silica-silicone core/shell material having a monodisperse particle diameter distribution. This core/shell material was evaluated in the same manner as in Example 1, and the results obtained are shown in Table 2.

Subsequently, the same hardener a and the same O/W emulsion of a chloroplatinic acid/olefin complex salt as those used in Example 1 were added to the above aqueous core/shell material emulsion in the same amounts under the same conditions as in Example 1. Thus, a silicone emulsion composition was obtained.

The silicone emulsion composition thus obtained was vulcanized and cured in the same manner as in Example 1 to produce a rubbery sheet, which was examined for properties. The results obtained are shown in Table 2.

The silicone emulsion composition was further cast on various substrates and vulcanized and cured, in the same manner as in Example 1. The rubbery sheet thus obtained on each of the various substrates was examined for adhesion to the substrate in the same manner as in Example 1, and the results obtained are shown in Table 2.

Furthermore, the silicone emulsion composition was sprayed and cured in the same manner as in Example 1 to obtain a silicone powder. The silicone powder obtained was examined for various properties. The silicone powder was mixed with poly(butylene terephthalate) and the mixture was extruded into pellets, under the same conditions as in Example 1. The pellets were subjected to the same evaluation as in Example 1. The results obtained are shown in Table 2.

TABLE 2

| | | Example | | | | |
|---|---|---|---|---|---|---|
| | | 5 | 6 | 7 | 8 | 9 |
| Composition of Core/shell Material Emulsion | Silica 1 | 1000 | 1000 | | | 1000 |
| | Silica 2 | | | | | |
| | Silica 3 | | | 1000 | 1000 | |
| | b-1 | 210 | 210 | 210 | 210 | 210 |
| | b-2 | 1.2 | 1.2 | 1.2 | 1.2 | |
| | b-3a | 4.2 | | | | |
| | b-3b | | 4.2 | | | |
| | b-3c | | | 4.2 | | |
| | b-3d | | | | 4.2 | |
| | b-3e | | | | | 1.2 |
| | Emulsifier 1 | 8.4 | 8.4 | | | 8.4 |
| | Emulsifier 2 | | | 30 | 30 | |
| | Distilled water | 470 | 470 | 470 | 470 | 470 |
| | Potassium hydroxide | | | 6.0 | 6.0 | |
| Conversion of Cyclic Siloxanes [%] | | 98.9 | 99.3 | 96.7 | 94.8 | 99.9 |
| Core/shell Material | Average particle diameter [nm] | 149 | 149 | 159 | 159 | 156 |
| | Particle diameter distribution | monodisperse | monodisperse | monodisperse | monodisperse | monodisperse |
| | Proportion of shells [%] | 49.8 | 48.8 | 50.0 | 49.7 | 49.6 |
| | Graft percentage [%] | 42.1 | 42.5 | 40.0 | 40.0 | 41.3 |
| | Graft of | 42.1 | 42.5 | 40.0 | 40.0 | 41.3 |

TABLE 2-continued

| | | Example | | | | |
|---|---|---|---|---|---|---|
| | | 5 | 6 | 7 | 8 | 9 |
| Composition of Silicone Composition | efficiency [%] Aqueous core/shell material emulsion | 100 | 100 | 100 | 100 | 100 |
| | Hardener a | 0.4 | 0.4 | 0.4 | 0.4 | 0.4 |
| | Hardener b | | | | | |
| | Chloroplatinic acid/olefin salt emulsion C-1 C-2 | 0.05 | 0.05 | 0.05 | 0.05 | 0.05 |
| Stability of Composition (25° C., 3 months) | | no change | no change | no change | no change | no change |
| Rubber Properties | Hardness (JIS A) | 55 | 57 | 50 | 52 | 52 |
| | Tensile strength [kgf/cm$^2$] | 38 | 35 | 25 | 24 | 35 |
| | Tensile stress at 100% elongation [kgf/cm$^2$] | 111 | 11 | 10 | 10 | 12 |
| | Elongation [%] | 280 | 280 | 220 | 210 | 270 |
| Adhesion to Substrates | Concrete | ◎ | ◎ | ◎ | ◎ | ◎ |
| | Mortar | ◎ | ○ | ○ | ○ | ○ |
| | Glass | ◎ | ○ | ○ | ○ | Δ |
| | Wood | ◎ | ◎ | ○ | ○ | ○ |
| | Steel sheet | ○ | ○ | ◎ | ◎ | Δ |
| | Paper | ◎ | ○ | ◎ | ◎ | ◎ |
| | Nylon fabric | ◎ | ○ | ◎ | ◎ | ○ |
| Yield of Silicone Powder | | 92.1 | 91.7 | 86.0 | 87.8 | 89.7 |
| Properties of Silicone Powder | Average particle diameter [μm] | 2.7 | 2.8 | 3.2 | 3.5 | 3.0 |
| | Particle shape | spherical | spherical | spherical | spherical | spherical |
| Composition of Resin Composition | Silicone powder | 10 | 10 | 10 | 10 | 10 |
| | Poly(butylene terephthalate) | 100 | 100 | 100 | 100 | 100 |
| Properties of Resin Composition | Dispersed state of powder particles evenness of dispersion) | even | even | even | even | even |
| | Particle shape | spherical | spherical | spherical | spherical | spherical |
| | Interfacial adhesion of particles | excellent | excellent | excellent | excellent | good |
| | Izod impact strength [kg · cm/cm] | 24.3 | 23.8 | 30.7 | 28.7 | 20.1 |

EXAMPLE 10

To a liquid mixture of 2.0 parts of polyoxyethylene(18) nonylphenyl ether (NIKKOL NP-18TX, manufactured by Nikko Chemicals Co., Ltd.; HLB, 19) and 320 parts of distilled water was added 100 parts of a polymethylhydrogensiloxane having a viscosity of 10 cSt and represented by the following formula.

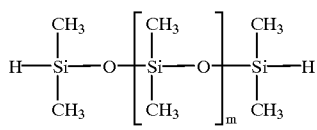

This mixture was preliminarily stirred with a homomixer and then treated twice with a homogenizer at a pressure of 300 kgf/cm$^2$ to conduct emulsification and dispersion. The resultant emulsion is referred to as hardener b.

To 100 parts of the main ingredient prepared in Example 1 (core/shell material emulsion; solid content, 24%) were subsequently added at 25° C. 28.3 parts of hardener b (solid content: 24%) (the addition amount corresponds to ten directly silicon-bonded hydrogen atoms per ethylenically unsaturated group) and 0.07 parts of an OW emulsion of a chloroplatinic acid/olefin complex salt (platinum content of the emulsion: 3 wt %). This mixture was homogenized by stirring to obtain a silicone emulsion composition.

The silicone emulsion composition thus obtained was vulcanized and cured in the same manner as in Example 1 to produce a rubbery sheet, which was examined for properties. The results obtained are shown in Table 3.

The silicone emulsion composition was further cast on various substrates and vulcanized and cured, in the same manner as in Example 1. The rubbery sheet thus obtained on each of the various substrates was examined for adhesion to the substrate in the same manner as in Example 1. The results obtained are shown in Table 3.

Furthermore, the silicone emulsion composition was sprayed and cured in the same manner as in Example 1 to obtain a silicone powder. The silicone powder obtained was examined for various properties. The silicone powder was mixed with poly(butylene terephthalate) and the mixture was extruded into pellets, under the same conditions as in Example 1. The pellets were subjected to the same evaluation as in Example 1. The results obtained are shown in Table 3.

EXAMPLES 11 AND 12

Silicone emulsion compositions were obtained in the same manner as in Example 1, except that 1.5 parts of 3-glycidoxypropyltrimethoxysilane (Example 11; referred to as "C-1") or 1.5 parts of the organosilicon compound represented by the following formula (Example 12; referred to as "C-2") was further added per 100 parts of the main ingredient in the preparation of the silicone emulsion composition.

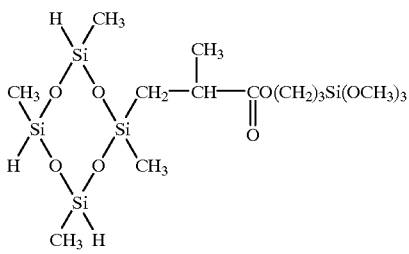

The silicone emulsion compositions thus obtained were vulcanized and cured in the same manner as in Example 1 to produce rubbery sheets, which were examined for properties. The results obtained are shown in Table 3.

The silicone emulsion compositions were further cast on various substrates and vulcanized and cured, in the same manner as in Example 1. The rubbery sheet thus obtained on each of the various substrates was examined for adhesion to the substrate in the same manner as in Example 1. The results obtained are shown in Table 3.

Furthermore, the silicone emulsion compositions were sprayed and cured in the same manner as in Example 1 to obtain silicone powders. The silicone powders obtained were examined for various properties. The silicone powders each was mixed with poly(butylene terephthalate) and the mixture was extruded into pellets, under the same conditions as in Example 1. The pellets were subjected to the same evaluation as in Example 1. The results obtained are shown in Table 3.

TABLE 3

| | | | Example | | |
|---|---|---|---|---|---|
| | | | 10 | 11 | 12 |
| Composition of Core/shell Material Emulsion | Silica 1 | | 1000 | 1000 | 1000 |
| | Silica 2 | | | | |
| | Silica 3 | | | | |
| | b-1 | | 210 | 210 | 210 |
| | b-2 | | 1.2 | 1.2 | 1.2 |
| | b-3a | | | | |
| | b-3b | | | | |
| | b-3c | | | | |
| | b-3d | | | | |
| | b-3e | | | | |
| | Emulsifier 1 | | 8.4 | 8.4 | 8.4 |
| | Emulsifier 2 | | | | |
| | Distilled water | | 470 | 470 | 470 |

TABLE 3-continued

| | | Example | | |
|---|---|---|---|---|
| | | 10 | 11 | 12 |
| | Potasaium hydroxide | | | |
| Conversion of Cyclic Siloxanes [%] | | 99.4 | 99.4 | 99.4 |
| Core/shell Material | Average particle diameter [nm] | 153 | 153 | 153 |
| | Particle diameter distribution | mono-disperse | mono-disperse | mono-disperse |
| | Proportion of shells [%] | 49.7 | 49.7 | 49.7 |
| | Graft percentage [%] | 41.7 | 41.7 | 41.7 |
| | Graft efficiency [%] | 41.7 | 41.7 | 41.7 |
| Composition of Silicone Composition | Aqueous core/shell material emulsion | 100 | 100 | 100 |
| | Hardener a | | 0.4 | 0.4 |
| | Hardener b | 28.3 | | |
| | Chloroplatinic acid/olefin salt emulsion | 0.07 | 0.05 | 0.05 |
| | C-1 | | 1.5 | |
| | C-2 | | | 1.5 |
| Stability of Composition (25° C., 3 months) | | no change | no change | no change |
| Rubber Properties | Hardness (JIS A) | 46 | 55 | 54 |
| | Tensile strength [kgf/cm$^2$] | 30 | 33 | 32 |
| | Tensile stress at 100% elongation [kgf/cm$^2$] | 10 | 12 | 12 |
| | Elongation [%] | 250 | 260 | 260 |
| Adhesion to Substrates | Concrete | ○ | ◎ | ◎ |
| | Mortar | ○ | ◎ | ◎ |
| | Glass | Δ | ○ | ◎ |
| | Wood | ○ | ◎ | ◎ |
| | Steel sheet | Δ | ○ | ○ |
| | Paper | ○ | ◎ | ◎ |
| | Nylon fabric | ○ | ◎ | ◎ |
| Yield of Silicone Powder | | 84.3 | 88.6 | 90.6 |
| Properties of Silicone Powder | Average particle diameter [μm] | 2.8 | 2.8 | 2.9 |
| | Particle shape | spherical | spherical | spherical |
| Makeup of Resin Composition | Silicone powder | 10 | 10 | 10 |
| | Poly(butylene terephthalate) | 100 | 100 | 100 |
| Properties of Resin Composition | Dispersed state of powder particles (evenness of dispersion) | even | even | even |
| | Particle shape | spherical | spherical | spherical |
| | Interfacial adhesion of particles | good | excellent | excellent |
| | Izod impact strength [kg · cm/cm] | 18.5 | 26.3 | 27.1 |

COMPARATIVE EXAMPLE 1

A polyorganosiloxane emulsion was prepared under the same conditions as in Example 1, using 210 parts of octamethylcyclotetrasiloxane (referred to as b-1), 1.2 parts of 1,3,5,7-tetravinyltetramethylcyclotetrasiloxane (referred to as b-2), 4.2 parts of dodecylbenzenesulfonic acid, and 630 parts of distilled water without using any colloidal silica.

The siloxane micelles in this emulsion had a particle diameter of 275 nm. The conversion of the octamethylcyclotetrasiloxane and 1,3,5,7- tetravinyltetramethylcyclotetrasiloxane into the polyorganosiloxane was 95.3%.

Subsequently, the same hardener a and the same OW emulsion of a chloroplatinic acid/olefin complex salt as those used in Example 1 were added to the above polyorganosiloxane emulsion in the same amounts under the same conditions as in Example 1. Thus, a silicone emulsion composition was obtained.

The silicone emulsion composition thus obtained was vulcanized and cured in the same manner as in Example 1 to produce a rubbery sheet, which was examined for properties. The results obtained are shown in Table 4.

The silicone emulsion composition was further cast on various substrates and vulcanized and cured, in the same manner as in Example 1. The rubbery sheet thus obtained on each of the various substrates was examined for adhesion to the substrate in the same manner as in Example 1. The results obtained are shown in Table 4.

Furthermore, the silicone emulsion composition was sprayed and cured in the same manner as in Example 1 to obtain a silicone powder. The silicone powder obtained was examined for various properties. The silicone powder was mixed with poly(butylene terephthalate) and the mixture was extruded into pellets, under the same conditions as in Example 1. The pellets were subjected to the same evaluation as in Example 1. The results obtained are shown in Table 4.

COMPARATIVE EXAMPLE 2

A polyorganosiloxane emulsion was prepared under the same conditions as in Example 1, using 210 parts of octamethylcyclotetrasiloxane (referred to as "b-1"), 1.2 parts of 1,3,5,7-tetravinyltetramethylcyclotetrasiloxane (referred to as "b-2"), 8.4 parts of dodecylbenzenesulfonic acid, and 470 parts of distilled water without using any colloidal silica.

The siloxane micelles in this emulsion had a particle diameter of 275 nm. The conversion of the octamethylcyclotetrasiloxane and 1,3,5,7-tetravinyltetramethylcyclotetrasiloxane into the polyorganosiloxane was 96.1%.

To 69 parts of the polyorganosiloxane emulsion prepared above were added at 25° C. 100 parts of Snowtex OL (silica 1), described above, 0.68 parts of the same hardener a as that used in Example 1 (solid content: 24%) (the addition amount corresponds to two directly silicon-bonded hydrogen atoms per ethylenically unsaturated group), and 0.05 parts of an O/W emulsion of a chloroplatinic acid/olefin complex salt (platinum content of the emulsion: 3 wt %). This mixture was homogenized by stirring to obtain a silicone emulsion composition.

The silicone emulsion composition thus obtained was vulcanized and cured in the same manner as in Example 1 to produce a rubbery sheet, which was examined for properties. The results obtained are shown in Table 2.

The silicone emulsion composition was further cast on various substrates and vulcanized and cured, in the same manner as in Example 1. The rubbery sheet thus obtained on each of the various substrates was examined for adhesion to the substrate in the same manner as in Example 1. The results obtained are shown in Table 4.

Furthermore, the silicone emulsion composition was sprayed and cured in the same manner as in Example 1 to obtain a silicone powder. The silicone powder obtained was examined for various properties. The silicone powder was mixed with poly(butylene terephthalate) and the mixture was extruded into pellets, under the same conditions as in Example 1. The pellets were subjected to the same evaluation as in Example 1. The results obtained are shown in Table 4.

COMPARATIVE EXAMPLES 3 AND 4

Silicone emulsion compositions were obtained in the same manner as in Example 1, except that the amount of hardener a (solid content, 24%) added in the preparation of the silicone emulsion composition was changed to 0.001 part (Comparative Example 3; the addition amount corresponds to 0.005 directly silicon-bonded hydrogen atoms per ethylenically unsaturated group) or 30 parts (Comparative Example 4; the addition amount corresponds to 150 directly silicon-bonded hydrogen atoms per ethylenically unsaturated group).

The silicone emulsion compositions thus obtained were vulcanized and cured in the same manner as in Example 1 to produce rubbery sheets, which were examined for properties. The results obtained are shown in Table 4.

The silicone emulsion compositions were further cast on various substrates and vulcanized and cured, in the same manner as in Example 1. The rubbery sheet thus obtained on each of the various substrates was examined for adhesion to the substrate in the same manner as in Example 1. The results obtained are shown in Table 4.

Furthermore, the silicone emulsion compositions were sprayed and cured in the same manner as in Example 1 to obtain silicone powders. The silicone powders obtained were examined for various properties. The silicone powders each was mixed with poly(butylene terephthalate) and the mixture was extruded into pellets, under the same conditions as in Example 1. The pellets were subjected to the same evaluation as in Example 1. The results obtained are shown in Table 4.

COMPARATIVE EXAMPLE 5

A silicone emulsion composition was obtained in the same manner as in Example 1, except that the addition of the O/W emulsion of a chloroplatinic acid/olefin complex salt (platinum content of the emulsion, 3 wt %) as a curing catalyst in the preparation of the silicone emulsion composition was omitted.

The production of a rubbery sheet from the silicone emulsion composition obtained above was attempted in the same manner as in Example 1. However, the silicone remained uncured and, hence, property evaluation was not conducted.

TABLE 4

| | | Comparative Example | | | | |
|---|---|---|---|---|---|---|
| | | 1 | 2 | 3 | 4 | 5 |
| Composition of Core/shell Material Emulsion | Silica 1 | | (1000) | 1000 | 1000 | 1000 |
| | Silica 2 | | | | | |
| | Silica 3 | | | | | |
| | b-1 | 210 | 210 | 210 | 210 | 210 |
| | b-2 | 1.2 | 1.2 | 1.2 | 1.2 | 1.2 |
| | b-3a | | | | | |
| | b-3b | | | | | |
| | b-3c | | | | | |
| | b-3d | | | | | |
| | b-3e | | | | | |
| | Emulsifier 1 | 4.2 | 8.4 | 8.4 | 8.4 | 8.4 |
| | Emulsifier 2 | | | | | |
| | Distilled water | 630 | 470 | 470 | 470 | 470 |
| | Potassium hydroxide | | | | | |
| Conversion of Cyclic Siloxanes [%] | | 95.3 | 96.1 | 99.4 | 99.4 | 99.4 |
| Core/shell Material | Average particle diameter [nm] | — | — | 153 | 153 | 153 |
| | Particle diameter distribution | — | — | monodisperse | monodisperse | monodisperse |
| | Proportion of shells [%] | — | — | 49.7 | 49.7 | 49.7 |
| | Graft percentage [%] | — | — | 41.7 | 41.7 | 41.7 |
| | Graft efficiency [%] | — | — | 41.7 | 41.7 | 41.7 |
| Composition of Silicone Composition | Aqueous core/shell material emulsion | 100 | 100 | 100 | 100 | 100 |
| | Hardener a | 0.2 | 0.4 | 0.001 | 30 | 0.4 |
| | Hardener b | | | | | |
| | Chloroplatinic acid/olefin salt emulsion | 0.05 | 0.05 | 0.05 | 0.05 | |
| | C-1 | | | | | |
| | C-2 | | | | | |
| Stability of Composition (25° C., 3 months) | | no change | no change | no change | no change | no change |
| Rubber Properties | Hardness (JIS A) | 21 | 47 | 36 | 40 | uncured |
| | Tensile strength [kgf/cm$^2$] | 8 | 18 | 20 | 28 | |
| | Tensile stress at 100% elongation [kgf/cm$^2$] | 4 | 9 | 8 | 10 | |
| | Elongation [%] | 210 | 200 | 180 | 210 | |
| Adhesion to Substrates | Concrete | ○ | ○ | ○ | ○ | uncured |
| | Mortar | ○ | ○ | ○ | ○ | |
| | Glass | x | x | x | x | |
| | Wood | Δ | Δ | Δ | Δ | |
| | Steel sheet | x | x | x | x | |
| | Paper | ○ | Δ | Δ | ○ | |
| | Nylon fabric | Δ | Δ | x | ○ | |
| Yield of Silicone Powder | | 72.1 | 76.7 | 68.9 | 79.4 | — |
| Properties of Silicone Powder | Average particle diameter [μm] | 4.3 | 4.8 | 4.5 | 3.9 | uncured |
| | Particle shape | spherical | spherical | spherical | spherical | |
| Composition of Resin Composition | Silicone powder | 10 | 10 | 10 | 10 | — |
| | Poly(butylene terephthalate) | 100 | 100 | 100 | 100 | — |
| Properties of Resin Composition | Dispersed state of powder particles (evenness of dispersion) | even | even | even | even | — |
| | Particle shape | irregular | irregular | irregular | irregular | — |

TABLE 4-continued

| | Comparative Example | | | | |
|---|---|---|---|---|---|
| | 1 | 2 | 3 | 4 | 5 |
| Interfacial adhesion of particles | poor | poor | poor | poor | — |
| Izod impact strength [kg · cm/cm] | 10.2 | 7.3 | 8.0 | 7.1 | — |

REFERENCE EXAMPLE

Test pieces for property evaluation were produced under the same conditions as in Example 1, except that no silicone powder was incorporated into the poly(butylene terephthalate). The test pieces were tested for impact resistance. As a result, the Izod impact strength thereof was found to be 6.0 kgf.cm/cm.

While the invention has been described in detail and with reference to specific embodiments thereof, it will be apparent to one skilled in the art that various changes and modifications can be made therein without departing from the spirit and scope thereof.

What is claimed is:

1. A silicone emulsion composition comprising:
   (A) 100 parts by weight of a colloidal silica-silicone core/shell material comprising
      (a) from 80 to 5 wt % of cores comprising a colloidal silica having an average particle diameter of from 4 to 300 nm, and
      (b) from 20 to 95 wt % of shells comprising a polyorganosiloxane represented by the average compositional formula $$R^1{}_a SiO_{(4-a)/2} \tag{I}$$

wherein $R^1$'s each represent a substituted or unsubstituted monovalent hydrocarbon group having 1 to 8 carbon atoms and "a" is a number of from 1.80 to 2.20, provided that from 0.01 to 25% by mole of the $R^1$'s each is a group containing an ethylenically unsaturated group;
   (B) a polyorganohydrogensiloxane having per molecule at least two units represented by the general formula $$R^2{}_b H_c SiO_{(4-(b+c))/2} \tag{II}$$

wherein $R^2$'s may be the same or different and each represent a substituted or unsubstituted monovalent hydrocarbon group having no ethylenically unsaturated group, b is an integer of from 0 to 2, and c is an integer of 1 or 2, provided that b+c is an integer of from 1 to 3, the amount of the polyorganohydrogensiloxane being such that the number of the silicon-bonded hydrogen atoms contained therein per ethylenically unsaturated group contained in ingredient (A) is from 0.01 to 100;
   (C) from 1×10-6 to 1 part by weight of a curing catalyst;
   (D) from 1 to 20 parts by weight of an emulsifying agent; and
   (E) from 50 to 1,000 parts by weight of water.

2. The silicon emulsion composition of claim 1, wherein the (C) curing catalyst comprises platinum compounds.

3. The silicon emulsion composition of claim 1, wherein the core/shell material is formed by polycondensation.

4. A process for producing a silicon powder which comprises bringing a silicone emulsion composition into contact with a liquid or a gas while heating the composition at a temperature of 25° C. or higher and keeping the same in a dispersed state to thereby cure the silicone in the form of a powder, wherein the silicone emulsion composition comprises:
   (A) 100 parts by weight of a colloidal silica-silicone core/shell material comprising
      (a) from 80 to 5 wt % of cores comprising a colloidal silica having an average particle diameter of from 4 to 300 nm, and
      (b) from 20 to 95 wt % of shells comprising a polyorganosiloxane represented by the average compositional formula $$R^1{}_a SiO_{(4-a)/2} \tag{I}$$

wherein $R^1$'s each represent a substituted or unsubstituted monovalent hydrocarbon group having 1 to 8 carbon atoms and "a" is a number of from 1.80 to 2.20, provided that from 0.01 to 25% by mole of the $R^1$'s each is a group containing an ethylenically unsaturated group;
   (B) a polyorganohydrogensiloxane having per molecule at least two units represented by the general formula $$R^2{}_b H_c SiO_{(4-(b+c))/2} \tag{II}$$

wherein $R^2$'s may be the same or different and each represent a substituted or unsubstituted monovalent hydrocarbon group having no ethylenically unsaturated group, b is an integer of from 0 to 2, and c is an integer of 1 or 2, provided that b+c is an integer of from 1 to 3, the amount of the polyorganohydrogensiloxane being such that the number of the silicon-bonded hydrogen atoms contained therein per ethylenically unsaturated group contained in ingredient (A) is from 0.01 to 100;
   (C) from $1 \times 10^{-6}$ to 1 part by weight of a curing catalyst;
   (D) from 1 to 20 parts by weight of an emulsifying agent; and
   (E) from 50 to 1,000 parts by weight of water.

5. The process of claim 4, wherein the core/shell material is formed by polycondensation.

* * * * *